United States Patent
Mishra

(10) Patent No.: US 9,963,222 B2
(45) Date of Patent: May 8, 2018

(54) AUTOMATICALLY STABILIZED AERIAL PLATFORM FOR CARRYING LIQUIDS

(71) Applicant: Tata Sons Limited, Mumbai, Maharashtra (IN)

(72) Inventor: Piyush Mishra, Bangalore (IN)

(73) Assignee: TATA SONS LIMITED, Maharashtra (IN)

(*) Notice: Subject to any disclaimer, the term of this patent is extended or adjusted under 35 U.S.C. 154(b) by 0 days. days.

(21) Appl. No.: 15/391,908

(22) Filed: Dec. 28, 2016

(65) Prior Publication Data

US 2017/0183084 A1  Jun. 29, 2017

(30) Foreign Application Priority Data

Dec. 28, 2015  (IN) .................... 4899/MUM/2015

(51) Int. Cl.
*B64C 17/00* (2006.01)
*B64D 1/18* (2006.01)
*B64C 39/02* (2006.01)
*G05D 1/08* (2006.01)

(52) U.S. Cl.
CPC .............. *B64C 17/00* (2013.01); *B64C 39/02* (2013.01); *B64D 1/18* (2013.01); *G05D 1/0816* (2013.01)

(58) Field of Classification Search
CPC .......... B64C 17/00; B64C 39/02; B64D 1/18; G05D 1/0816
See application file for complete search history.

(56) References Cited

U.S. PATENT DOCUMENTS

2015/0008235 A1  1/2015  Khoshsepehr
2016/0318708 A1*  11/2016  Kim .................. B65D 90/52

FOREIGN PATENT DOCUMENTS

CN  103935518 A  7/2014

* cited by examiner

*Primary Examiner* — Basil T. Jos
(74) *Attorney, Agent, or Firm* — Baker & Hostetler LLP

(57) ABSTRACT

The present application is at least directed to an automatically stabilized aerial platform. The platform includes one or more containers including one or more liquids. The platform also includes one or more sensors coupled to the one or more liquids. The platform also includes one or more flight controllers operatively coupled to the one or more sensors. The flight controllers are configured to automatically adjust flight control elements in real-time to compensate for sensor values indicating sloshing of the one or more liquids beyond a specified limit. The instant application is also directed to a method of automatic real-time stabilization of an aerial platform carrying at least one liquid.

13 Claims, 5 Drawing Sheets

AUTOMATICALLY STABILIZED AERIAL PLATFORM FOR CARRYING LIQUIDS

FIELD

The present disclosure relates generally to the field of aerial platforms and more specifically to an automatically stabilized aerial platform for carrying liquids and an associated method for automatically controlling a said platform in real time

BACKGROUND

Aerial vehicles often carry liquids either as fuel or as payload for delivery to one or more destinations. When such liquids are carried, for example for aerial spraying, transportation or mid-air refueling, there is danger of instability in the flight behaviour of the aerial vehicle on account of sloshing of the liquid during acceleration/deceleration or other sudden movements. To prevent such flight instability, it is necessary to implement "anti-sloshing" measures. The situation is particularly severe during low-altitude flights owing to greater turbulence owing to significant change in wind speed and direction in the first 30 meters of height over ground level caused by the varying frictional effect and undulations of the ground surface. Such low-level flights also require frequent flight course changes to avoid obstacles in the form of trees, bushes, and other structures, etc.

Conventional methods of implementing "anti-sloshing" include the incorporation of baffles and sub-compartments in the design of the container carrying the liquid. Such designs break large liquid surface areas into smaller surface areas and distribute resulting forces on greater container boundary surfaces to reduce the impact of sloshing. CN103935518A describes the use of such a combination of baffles on the inside and dampeners on outside of the container to reduce sloshing. However, there are three major drawbacks to these approaches:

(a) increased container weight, a parameter which is a premium on aerial platform,
(b) additional cost owing to increased material and design and construction complexity,
(c) sub-optimal performance owing to the use of a static structure which is designed for the worst-case scenario.

The anti-slosh performance of these solutions varies based on level of liquid inside the container, velocity profile of the aerial vehicle, etc.

Another known approach uses various types of float balls or energy-absorbers to reduce sloshing. US20150008235 describes an apparatus and method to limit slosh and spillage in a liquid container using such a technique. A plurality of balloons are disposed inside a liquid container to take up space as liquid is removed from the container. The balloons can be connected to a gas injection system to inject gas into the balloons ensure that the balloons fully occupy the empty space and maintain minimum exposed liquid surface area. This acts to limit the sloshing of the liquid inside the container. The balloons can be secured in place by one or more positioning boxes disposed along the inside periphery of the container. One or more strings can interconnect the balloons to the positioning boxes. However, the efficacy of this solution varies as fluid volume changes due to dispersion. Also, this approach requires additional components (balloons, strings, positioning boxes etc.) which increase the cost, weight, and design complexity.

The above-mentioned schemes do not monitor the sloshing behaviour and are unable to take any corrective action based on these observations. A research paper "Active Sloshing Control in a smart flexible cylindrical floating roof tank" by Hasheminejad et. al. focuses on the use of an exact 3-d coupled hydro-elastic model to analyse transient liquid sloshing in a vertically standing, flexible, circular cylindrical shell container fitted with a freely floating, piezo-sandwich, thin elastic circular plate. The sloshing is minimized by deploying two evolutionary heuristic optimization techniques to control the movement of the plate on the basis of measured volume displacement and volume velocity feedback of the sloshing liquid.

However, this design requires additional components (plate) which increases the cost, weight, and design complexity, and also suffers from poor performance in severe sloshing conditions and is susceptible to the potential for plate deformation etc. It is also restricted to a specific class of containers (vertically standing, flexible, circular cylindrical shell).

The present disclosure provides a solution which overcomes the above-stated limitations of the prior art by providing real-time control to maintain platform stability by counteracting and minimizing sloshing whenever necessary.

SUMMARY

The disclosure provides an automatically stabilized aerial platform comprising one or more containers containing one or more liquids, one or more sensors coupled to said one or more liquids, and one or more flight controllers operatively coupled to the one or more sensors and configured to automatically adjust flight control elements in real-time to compensate for sensor values that indicate sloshing of said one or more liquids beyond specified limits.

The present disclosure achieves improved performance by actively monitoring and appropriately reacting to sloshing characteristics in real-time, thereby improving the performance of any liquid carrying system.

BRIEF DESCRIPTION OF THE DRAWINGS

These and other features, aspects, and advantages of the present disclosure will become better understood when the following detailed description is read with reference to the accompanying drawings in which like characters represent like components throughout the drawings, wherein.

DETAILED DESCRIPTION OF THE DRAWINGS

Figure 1:
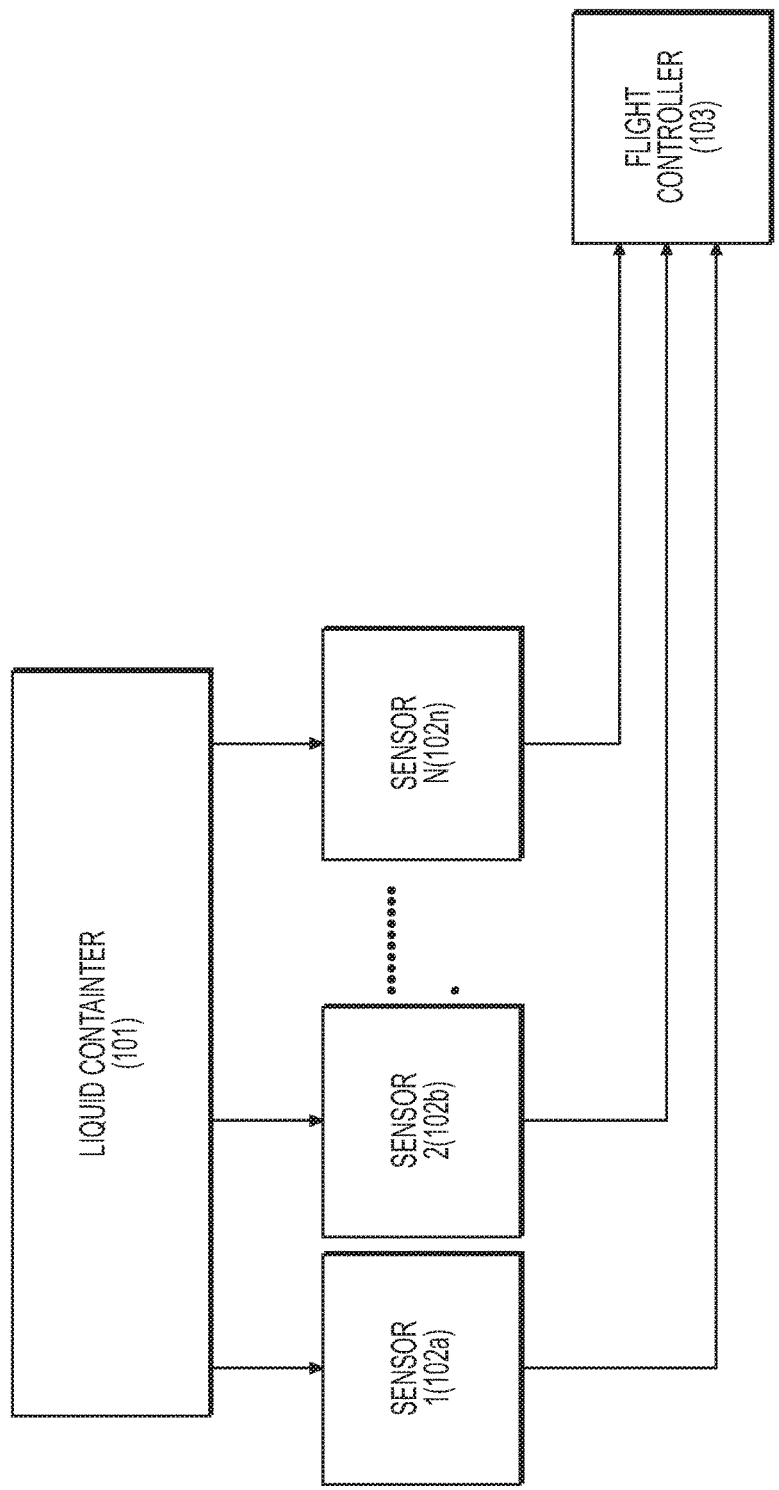
FIG. 1 depicts a block diagram showing the most basic form of the construction of the device in the present disclosure
Figure 2:
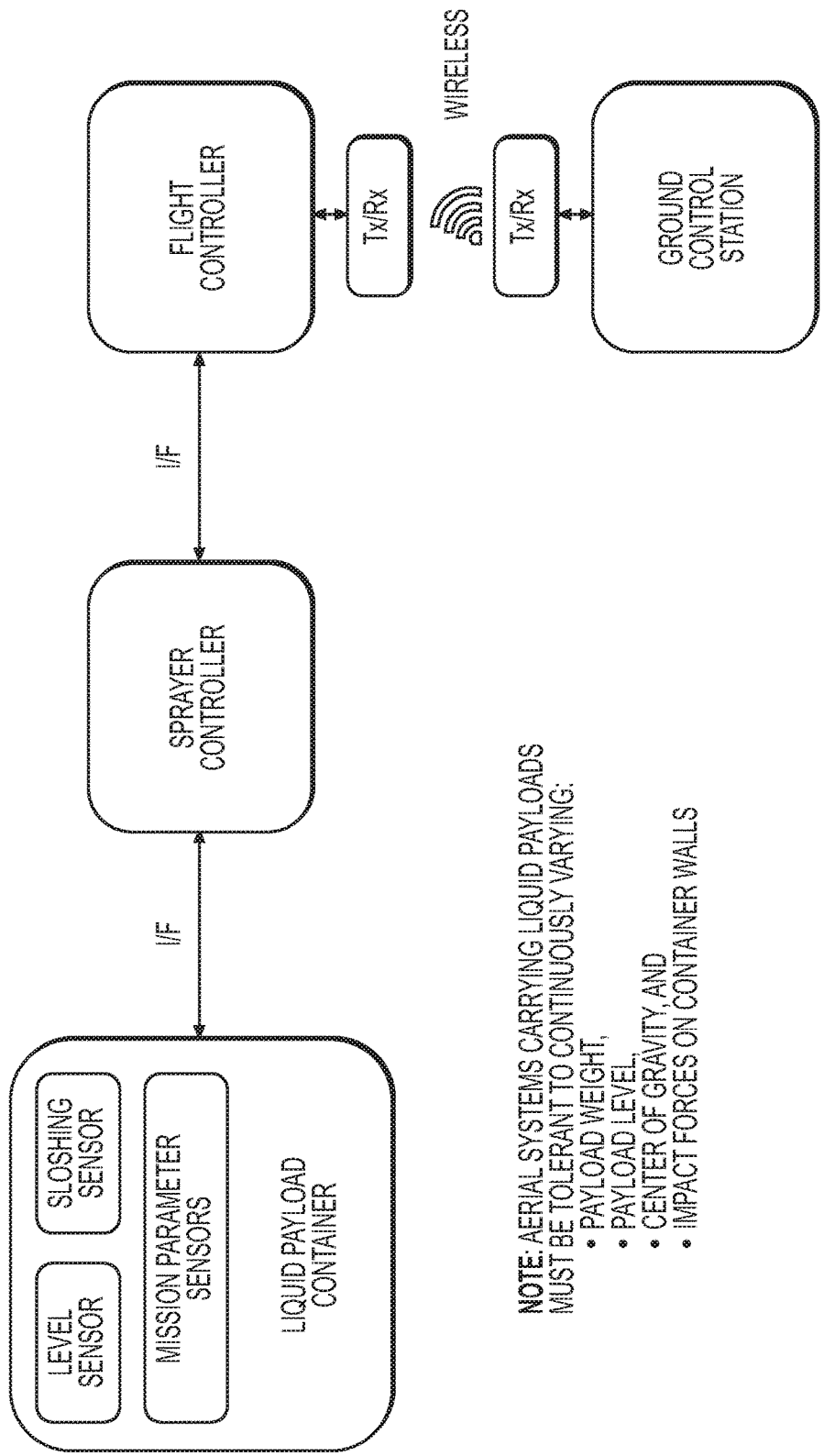
FIG. 2 depicts an embodiment of the device of the present disclosure in which the aerial platform carries an aerial sprayer
Figure 3:
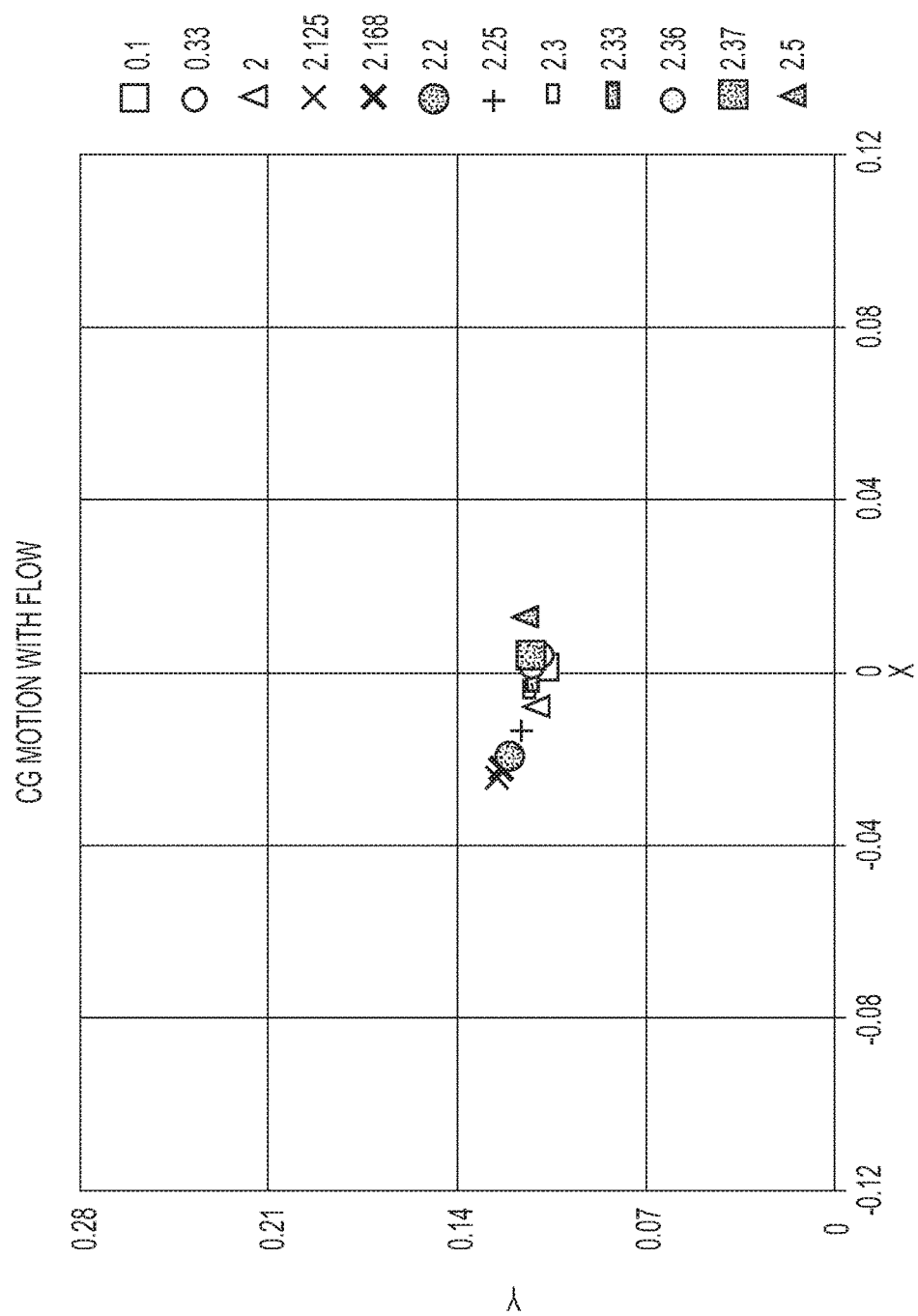
FIG. 3 shows an example of time-variation in centre-of-gravity in an example
Figure 4:
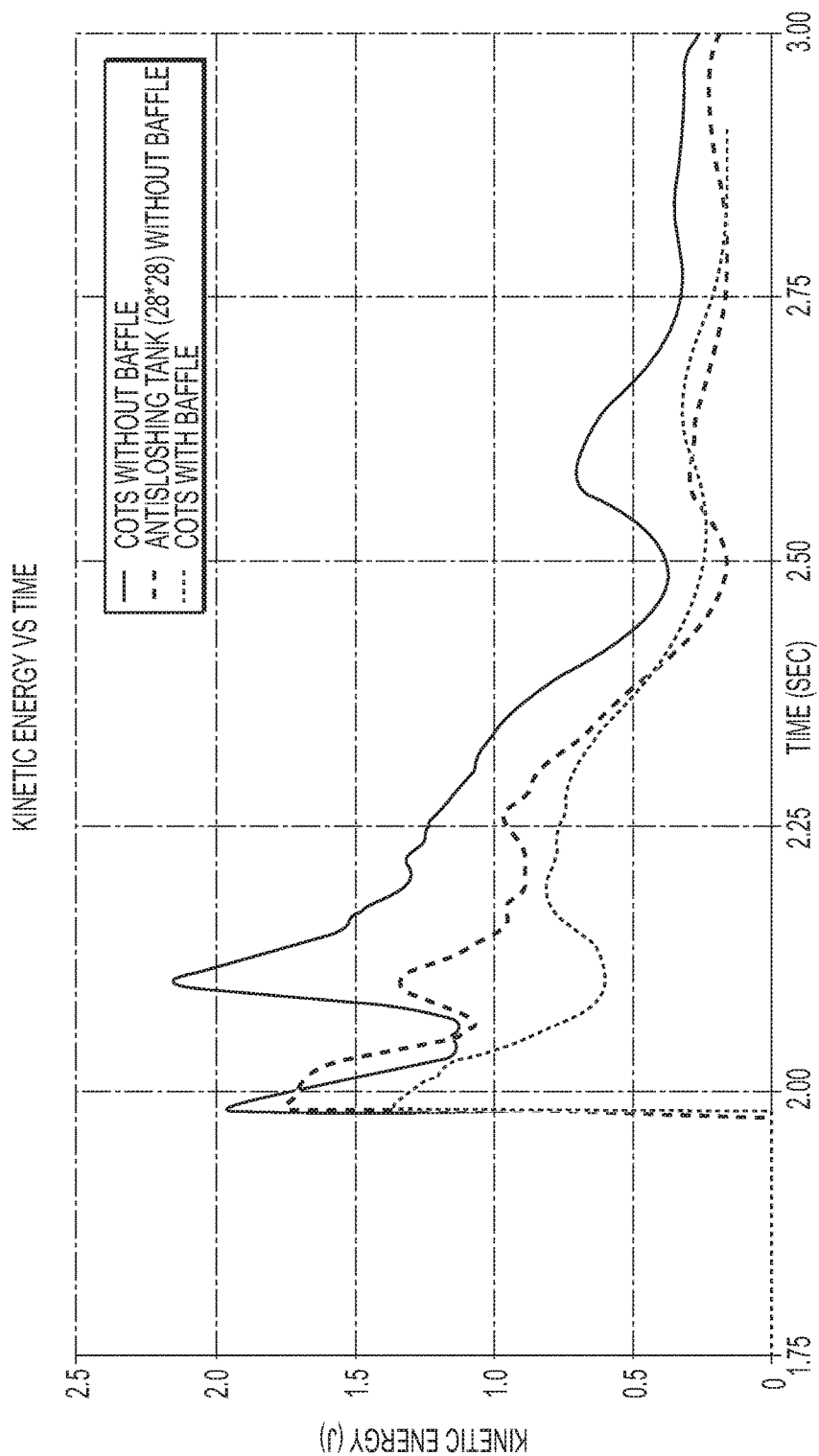
FIG. 4 shows a time profile of the kinetic energy of the liquid payload when it sloshes inside its container in another example
Figure 5:
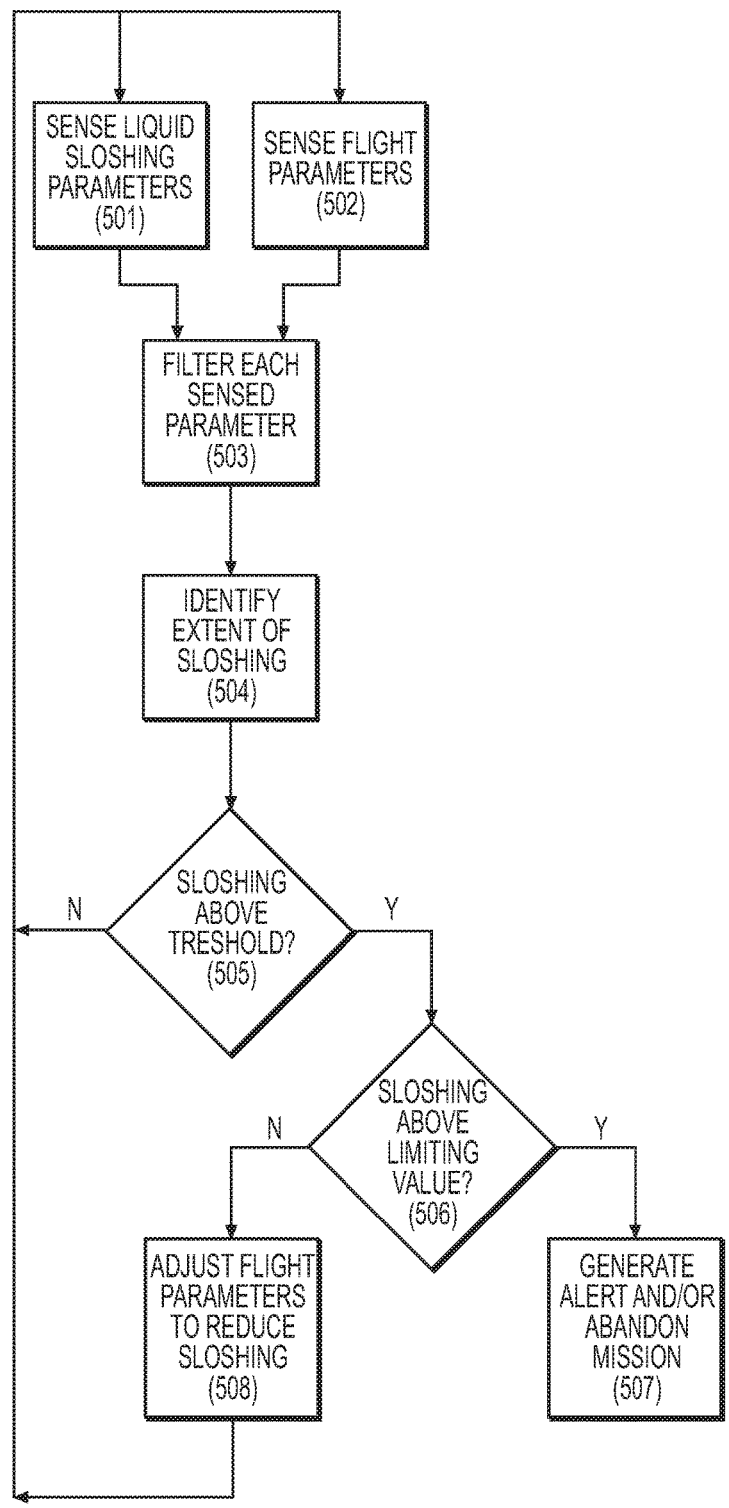
FIG. 5 shows a flow chart describing the operation of the system according to the disclosure

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

The automatically stabilized aerial platform and associated method in the present disclosure reduces sloshing of liquids carried by aerial platforms and thereby provides enhanced platform stability and endurance. The structure and functioning of the system is such that it reduces sloshing at differing liquid levels by monitoring and dynamically adapting to real-time flight conditions. Besides reducing sloshing, real-time response also achieves faster dampening performance.

FIG. 1 shows a block diagram showing the most basic form of the construction of the device in the present disclosure. One or more containers (101) containing one or more liquids has sensors (102*a*-102*n*) which measure various parameter including liquid level at multiple points in the container, forces exerted on the inner surfaces of the container, as well as liquid flow rate. Examples of such sensors include ultrasound sensors, impact force sensors, pressure sensors and flow-rate sensors. The sensed parameters are provided to Flight Controller (103) which analyses the measured values in conjunction with other measured parameters pertaining to external conditions and mission requirements and adaptively controls the flight of the aerial vehicle as and when required.

FIG. 2 depicts an embodiment of the device of the present disclosure in which the aerial platform carries an aerial sprayer. In this embodiment the aerial platform carries a liquid payload which needs to be sprayed over a defined area. The mission parameters include details on the area to be sprayed, the volume of liquid over a unit of area, the speed of the platform to ensure optimum coverage of the area, the volume of liquid per spray, the time period, interval or duration of spraying etc. In an embodiment, the area to be sprayed is defined in terms of its coordinates. In an embodiment, the liquid being sprayed is an insecticide or pesticide and is sprayed over an area covered with crops. In another embodiment, the liquid being sprayed is an aromatic fragrance and is sprayed over an enclosed area. The liquid being sprayed forms the payload and is stored in one or more containers of the aerial platform. The liquid is in contact with one or more sensors which are configured to measure and communicate details pertaining to any sloshing that occurs while the aerial platform is in motion. This information is sent in real-time to the payload controller. The manner in which sloshing is determined by the sensor readings can differ in different scenarios. These readings itself can be taken after one or more predefined time intervals. In an embodiment, one or more of the sensors are level sensors which measure the difference in the level of the liquid at one or more places in real-time to detect sloshing. Similarly, level sensors may also be used to detect the changes or difference in height and/or depth of the free surface area. In another embodiment, the shift in centre of gravity of the liquid in a time interval is used to detect sloshing. In yet another embodiment, impact force sensors are used to detect sloshing by measuring the forces exerted on the inner surfaces of the container.

The payload controller interfaces with the flight controller which is configured to control the motion of the aerial platform based on the inputs and/or signals received from the payload controller. The flight controller in turn interfaces with the payload controller and is configured to send real-time or predictive data to the payload controller. The flight controller controls the motion of the aerial platform based on the mission parameters and/or the inputs received from the payload controller. The flight controller captures aerial platform operation and external environment factors in real time. The platform operation parameters include the speed, trajectory, acceleration/deceleration amongst others and the external environment factors include wind velocity and direction, and obstacle detection amongst others. The flight controller can also present the information to the operator on the ground for other control actions.

The anti-sloshing device of the present disclosure does not use any additional components s to reduce the sloshing as the liquid level reduces due to dispersion from the sprayer. The device can work with desired operational settings which include the flow rate and sloshing threshold. It actuates corrective mechanisms to reduce or handle the impact of the residual sloshing. The flight controller either individually or in conjunction with the payload controller acts to counter variation in the centre of gravity by modifying one or more flight parameters, e.g., updating the platform speed and/or trajectory and/or flow rate. For example, spraying may be interrupted if the sloshing exceeds a limiting value or if the flow rate drops below a specified minimal value. Flow rate dropping below a certain value could also indicate a pump failure or a nozzle blockage but mission parameter sensors, such as voltage and current sensors, can be leveraged to differentiate and isolate the source of failures. The flight controller may even enforce fail-safe mechanisms, e.g., triggering the return-to-base feature of aerial platform in case sloshing levels remain uncontrolled and reach extreme values.

FIG. 3 shows an example of time-variation in Centre-of-gravity derived from the inputs from the various sensors during a typical aerial mission at a particular liquid level in a given container when the liquid is dispensed at a specific flow-rate. The shifts in the Centre-of-gravity are detected by the system of the present disclosure and corrective actions are taken to minimize such shifts.

FIG. 4 shows a time profile of the kinetic energy of the liquid payload when it sloshes inside its container. Such kinetic energy surges can have a significant impact on the stability of the aerial platform. The system of the present disclosure acts to dampen the kinetic energy surges very significantly and thereby eliminate or minimize the impact on the stability of the aerial platform during flight.

FIG. 5 shows a flow chart describing the operation of the system according to the disclosure. One set of sensors continuously sense liquid sloshing parameters (501) in real-time such as liquid level at multiple points in the container. Another set of sensors provide real-time values of flight parameters (502) such as wind velocity, flight trajectory, etc. The outputs from sensors used for monitoring the sloshing are dynamically filtered on the basis of data obtained from the flight sensors (503) before being processed to identify the presence and extent of sloshing (504). The processing includes the determination of the instantaneous position of the Centre-of-Gravity of the system and the dynamic determination of the permissible threshold values of the sloshing taking into consideration the existing flight parameters and conditions. If the sloshing is determined to be above the existing threshold values (505) then it is compared with the maximum permissible levels
(506) in which case suitable alarms are generated and the mission may be aborted (507)—this is defined by the specified failsafe conditions. On the other hand, if the sloshing is below maximum limit then the flight controller implements appropriate corrective measure (508) such as reducing acceleration/deceleration or adjusting the trajectory to induce dampening.

For example, consider an aerial sprayer, where flight controller is programmed with flight parameters including trajectory, speed, and altitude and payload controller is programmed with mission parameters, including flow rate, pressure, and sloshing threshold. Under ideal conditions, i.e. lack of external forces and in autonomous flight mode, the flight and payload controllers are fully aware of acceleration and deceleration profiles. Payload sensors continuously monitor liquid level and sloshing properties. The flight controller communicates either real-time or predictive parameters to the payload controller adapt filter settings and mission parameters. Payload controller uses the flight information and sensor readings to filter out and differentiate between predicted and spurious transients in sensing data. In case filtered sloshing behaviour exceeds the pre-programmed thresholds, feedback signals are sent to the flight controller to generate corrective action (e.g.). The liquid level sensor data is also used to continuously adapt the sloshing threshold settings since sloshing behaviour is dependent on the percentage volume of liquid in the container. The updated values are compared against threshold and mission requirements for violations and corresponding corrective actions. For example, if liquid level at sprayer outlet is unable to sustain desired flow rate, the controllers may decide to suspend or abandon mission.

Next consider the impact of external factors, such as wind gust, obstacle avoidance, or manual mode of operation, all of which could result in unstable and inefficient performance due to liquid sloshing.

In addition to the foregoing elimination or minimization of the sloshing the arrangement of the disclosure also provides the additional capability to adaptively optimize the system performance in real-time on the basis of instantaneous liquid level or liquid level averaged over selected intervals of time. This enables enhanced mission execution capability for instance by enabling the aerial platform to increase its range and/or payload carrying capability and/or its ability to be deployed in adverse ambient conditions.

Although the disclosure has been described with reference to specific embodiments, this description is not meant to be construed in a limiting sense. Various modifications of the disclosed embodiments, as well as alternate embodiments of the disclosure, will become apparent to persons skilled in the art upon reference to the description of the disclosure. It is therefore contemplated that such modifications can be made without departing from the spirit or scope of the present disclosure as defined.

I claim:

1. An automatically stabilized aerial platform comprising:
- One or more containers containing one or more liquids;
- One or more sensors coupled to said one or more liquids; and
- One or more flight controllers operatively coupled to the one or more sensors and configured to automatically adjust flight control elements in real-time to compensate for sensor values that indicate sloshing of said one or more liquids beyond specified limits.

2. A platform as claimed in claim 1, wherein one or more of said liquids is liquid payload for delivery to one or more locations.

3. A platform as claimed in claim 2 wherein said platform is an aerial sprayer.

4. A platform as claimed in claim 2 wherein said delivery of liquid payload is regulated by a payload controller.

5. A platform as claimed in claim 4 wherein said payload controller is operatively coupled to said flight controller for enabling payload delivery control based on flight parameters comprising one or more of platform trajectory, platform acceleration/deceleration, wind velocity and direction, and obstacle detection.

6. A platform as claimed in claim 4 wherein the flight controller is configured to determine and share predictive parameter values with said payload controller for operation.

7. A platform as claimed in claim 1 wherein one or more of said sensors is a level sensor, pressure sensor, flow-rate sensor, or impact force sensor.

8. A platform as claimed in claim 1, wherein the flight controller is configured to communicate real time information to one or more ground control stations.

9. A platform as claimed in claim 1, wherein the flight controller is wirelessly coupled to a Ground Control Station (GCS) which provides one or more mission parameters including the ideal/safe/acceptable flight and payload parameter values or range of values.

10. A method of automatic real-time stabilization of an aerial platform carrying at least one liquid comprising the steps of:

sensing and filtering one or more parameters related to sloshing of one or more of said liquids;
sensing and filtering one or more flight parameters;
identifying the occurrence and extent of sloshing;
deciding the need for compensating for said sloshing to maintain a required level of stability; and
automatically adjusting one or more flight parameters to compensate for said sloshing when needed.

11. A method as claimed in claim 10, wherein the sensing of parameters comprises at least one of the following steps:
sensing the liquid level at multiple points on the surface of said one or more liquids;
sensing the pressure at multiple points of the container(s) in which said liquid(s) is(are) housed;
sensing the impact force on one or more inner surface of the container(s) housing said liquid(s); and
sensing the flow-rate of said liquid(s).

12. A method as claimed in claim 10, wherein the said identifying the occurrence and extent of sloshing comprises the steps of:
filtering the sensed parameters to eliminate noise; and
determining one or more of liquid level time profiles, container inner surface pressure distribution time profiles and Centre-of-Gravity time shifts.

13. A method as claimed in claim 10, wherein the said deciding the need for compensating for said sloshing to maintain a required level of stability comprises the steps of:
dynamically defining threshold values for the permissible degree of sloshing based on instantaneous flight status; and
determining whether the identified extent of sloshing exceeds said threshold.

* * * * *